United States Patent
Yen et al.

(10) Patent No.: US 7,431,595 B1
(45) Date of Patent: Oct. 7, 2008

(54) UNIVERSAL MEMORY CARD CONNECTOR

(75) Inventors: Ming Hui Yen, Taipei Hsien (TW); Chun Ming Lai, Taipei Hsien (TW)

(73) Assignee: Chant Sincere Co., Ltd., Taipei Hsien (TW)

( * ) Notice: Subject to any disclaimer, the term of this patent is extended or adjusted under 35 U.S.C. 154(b) by 0 days.

(21) Appl. No.: 11/808,442

(22) Filed: Jun. 11, 2007

(51) Int. Cl.
*H01R 13/44* (2006.01)

(52) U.S. Cl. .................................... 439/138; 439/630

(58) Field of Classification Search ............... 439/138, 439/136, 142, 188, 630
See application file for complete search history.

(56) References Cited

U.S. PATENT DOCUMENTS

| | | | |
|---|---|---|---|
| 6,120,322 A * | 9/2000 | Ho et al. | 439/541.5 |
| 6,368,122 B2 * | 4/2002 | Billman | 439/138 |
| 6,717,805 B2 * | 4/2004 | Liu et al. | 361/684 |
| 6,887,087 B2 * | 5/2005 | Lai et al. | 439/138 |
| 7,044,757 B1 * | 5/2006 | Yen | 439/138 |
| 2004/0067667 A1 * | 4/2004 | Kuroki | 439/138 |
| 2006/0046542 A1 * | 3/2006 | Obara et al. | 439/135 |
| 2007/0134987 A1 * | 6/2007 | Yen | 439/630 |

* cited by examiner

*Primary Examiner*—Hien Vu
(74) *Attorney, Agent, or Firm*—Bacon & Thomas, PLLC

(57) ABSTRACT

In a memory card connector, a pivot shaft member is pivotally provided in a front side of the insertion hole for memory card for controlling the gap of the insertion hole for the insertion of a different memory card. The pivot shaft member has a protruding portion protruded from the periphery, and a guide block extending from the protruding portion for guiding the insertion of a thin type memory card into the insertion hole in horizontal. Insertion of a thick memory card into the insertion hole forces the protruding portion to rotate the pivot shaft and to hold down the front row of terminals in the memory card connector, preventing deformation or damage of the terminals due to improper insertion of the memory card into the insertion hole.

9 Claims, 7 Drawing Sheets

US 7,431,595 B1

UNIVERSAL MEMORY CARD CONNECTOR

BACKGROUND OF THE INVENTION (a) Field of the Invention

The present invention relates to a memory card connector and more particularly, to a universal memory card connector, which has a pivot shaft member pivotally provided in the front side of the insertion hole for memory card and rotatable between two positions to control the gap of the insertion hole for the insertion a different type of memory card.

(b) Description of the Prior Art

Various different types of memory cards, such as SD memory card, MMC and MMC4.0 memory card, MS memory card, XD memory card, SM memory card, mini SD memory card, RS-MMC memory card, RS-MMC4 memory card, and etc are commercially available. These memory cards have different sizes. Therefore, universal memory card connectors are developed for receiving any of a variety of memory cards.

A conventional universal memory card connector is known comprising a metal top cover, a terminal holder block, and multiple metal conducting terminals. The universal memory card has a common insertion hole for the insertion of any of a variety of memory cards. The common insertion hole has a stepped structure. When inserting a thin type memory card (for example, mini SD memory card) into the common insertion hole, the thin type memory card may be tilted or biased toward the left or right side and forced to hit the row of metal conducting terminals at the front side of the terminal holder block, causing the metal conducting terminals to be curved or damaged.

The applicant of the present invention filed an application for patent on May 11, 2005 under application Ser. No. 11/126,222, entitled "Universal memory card adapter having movable door", that eliminates the aforesaid drawback. According to this design, the memory card adapter comprises a movable door horizontally pivotally mounted in the stepped receiving open side thereof to control insertion of different memory cards. The movable door has a doorplate pivotally mounted in the stepped receiving open side and dividing the stepped receiving open side into an open type insertion slot and a sheltered insertion slot to match the insertion of different memory cards, a spring member for holding the doorplate in a normal close position, and a control spring strip, which normally stops the doorplate in the normal close position and is disconnected from the doorplate upon insertion of a matching memory card. This design is functional, however it uses a number of parts, complicating the installation and increasing the cost.

SUMMARY OF THE INVENTION

The present invention has been accomplished under the circumstances in view. According to one aspect of the present invention, the memory card connector comprises a pivot shaft member pivotally disposed in the front side of the insertion hole for memory card. The pivot shaft member has a protruding portion, and a guide block extending from the protruding portion. The guide block has a horizontally extending guide surface. When inserting a thin type memory card into the insertion hole, the guide surface guides the memory card into the insertion hole in horizontal, preventing biasing. When inserting a thick memory card into the insertion hole, the memory card will touch the protruding portion, causing the pivot shaft member to rotate through an angle, and the inner part of the protruding portion will be forced downwards against the front row of terminals to prevent damage. When ejecting the inserted memory card, the front row of terminals imparts a spring force to the pivot shaft member, rotating the pivot shaft member in the reversed direction to its former position. Because the invention uses a small number of parts, the memory card connector can easily and quickly be assembled. Further, the simple structural design greatly reduces the cost of the memory card connector.

According to another aspect of the present invention, the pivot shaft member comprises a stop block at one end of the protruding portion, and the electrically insulative terminal holder block of the universal memory card connector comprises a flange for stopping the stop block to hold the pivot shaft member in such a position that the guide surface of the guide block is kept in horizontal for guiding a thin type memory card into the insertion hole in horizontal.

According to still another aspect of the present invention, the electrically insulative terminal holder block comprises a recessed receptacle for receiving the guide block of the pivot shaft member.

DETAILED DESCRIPTION OF THE PREFERRED EMBODIMENTS

Referring to FIGS. 1~10, a universal memory card connector in accordance with a first embodiment of the present invention is shown comprised of a top cover 1, an electrically insulative terminal holder block 2, and a pivot shaft member 3.

Figure 1:
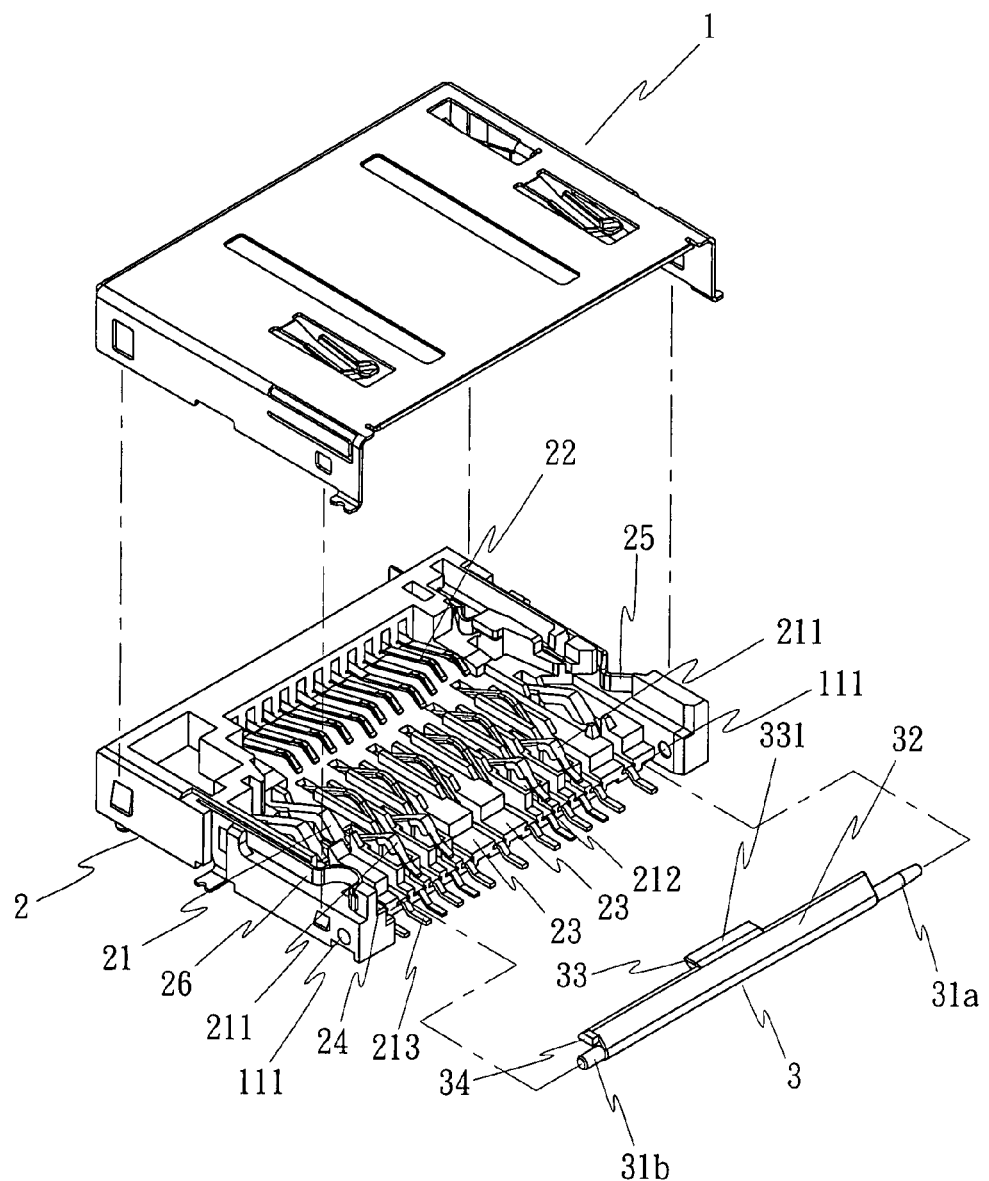
FIG. 1 is an exploded view of a universal memory card connector in accordance with a first embodiment of the present invention.

The top cover 1, as shown in FIG. 1, is a metal cover plate fitting over the terminal holder 1 to form with the terminal holder 1 the body of the memory card connector that defines an insertion hole 11 at one side for the insertion of any of a variety of memory cards, for example, a thin type memory card (such as mini SD memory card) 4, or a thick memory card (such as SD memory card) 5.

Figure 2:
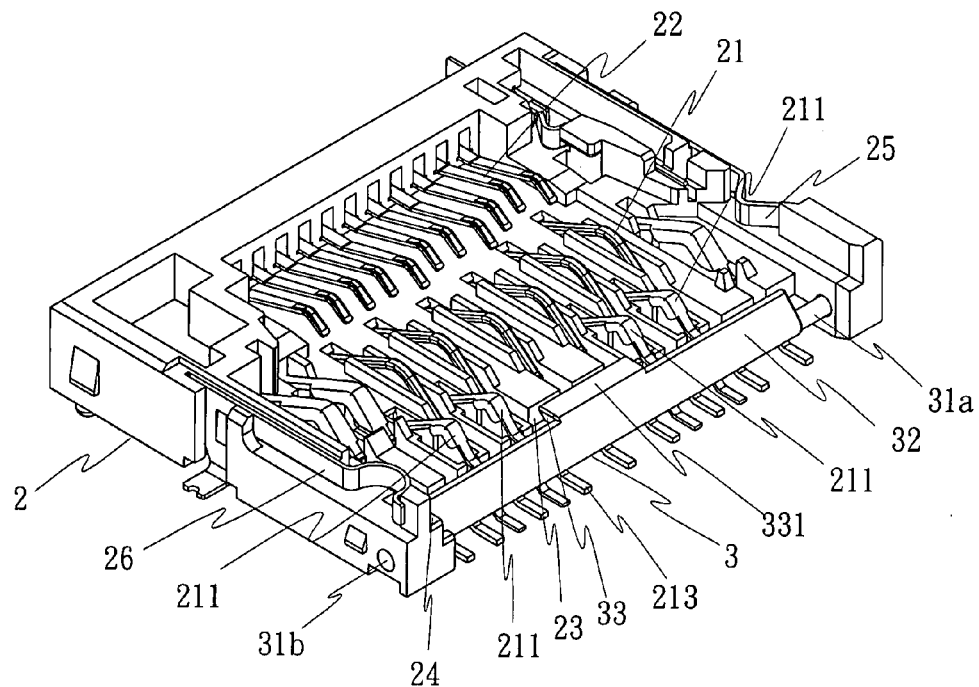
FIG. 2 is an elevational assembly view of the universal memory card connector according to the first embodiment of the present invention (the top cover excluded).

The terminal holder block 2, as shown in FIGS. 1 and 2, is an electrically insulative member holding multiple sets of terminals 21, 22 for the connection of different memory cards selectively. Because the arrangement and composition of the sets of terminals 21, 22 are of the known art and not within the scope of the claims of the present invention, not further detailed descriptions in this regard is necessary. The terminal holder block 2 has at least one recessed receptacle 23 corresponding to the terminal grooves 212 for the front row of terminals 211, and a flange 24 at one end of the front side (see FIG. 7). Further, the terminal holder block 2 may be provided with probe 25, read write protect plate 26, and grounding terminals or solder pads (not shown).

Figure 3:
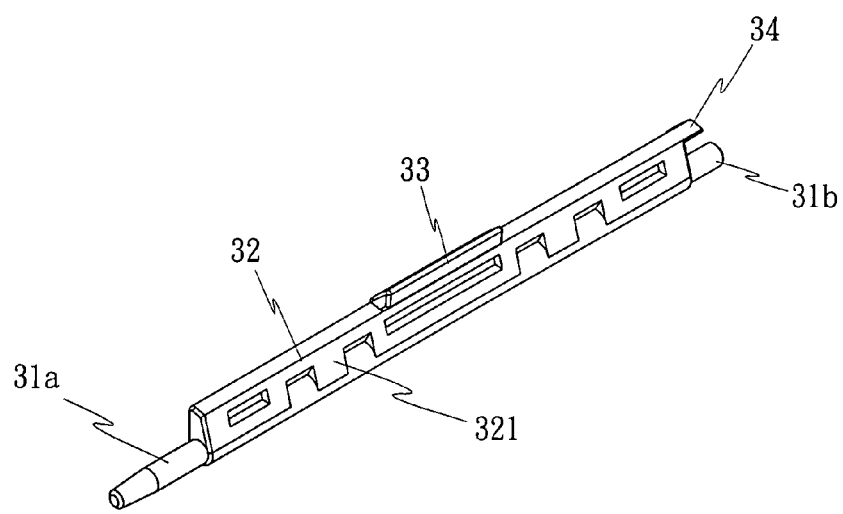
FIG. 3 is an elevational view of the pivot shaft member for the universal memory card connector according to the first embodiment of the present invention.
Figure 4:
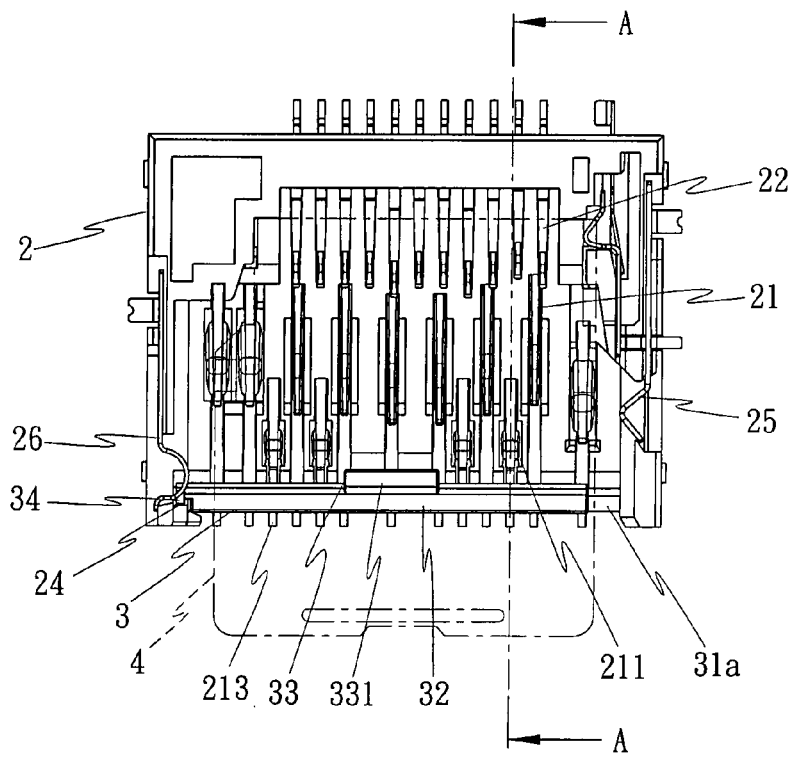
FIG. 4 is a schematic top view of the universal memory card connector according to the first embodiment of the present invention (the top cover excluded).
Figure 5:
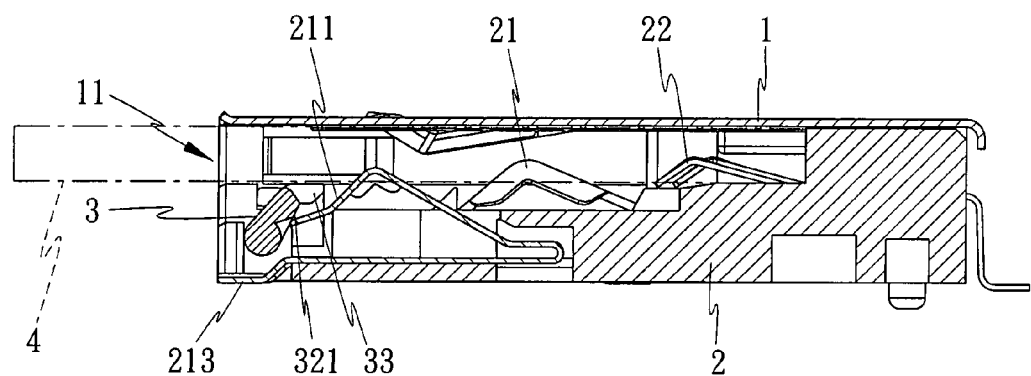
FIG. 5 is a sectional view taken along line A-A of FIG. 4.
Figure 6:
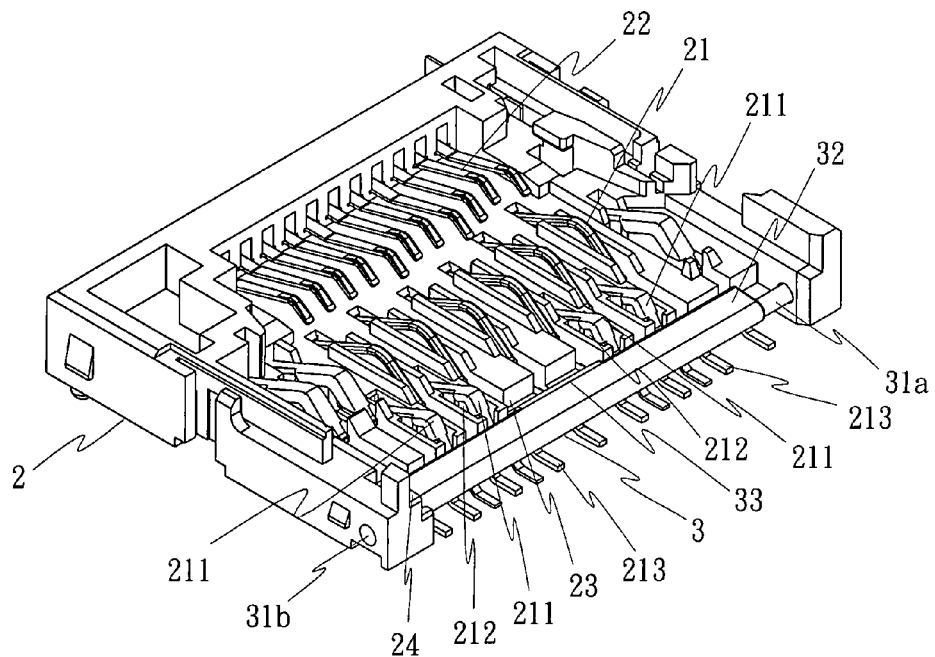
FIG. 6 is similar to FIG. 4 but showing the pivot shaft member rotated.
Figure 7:
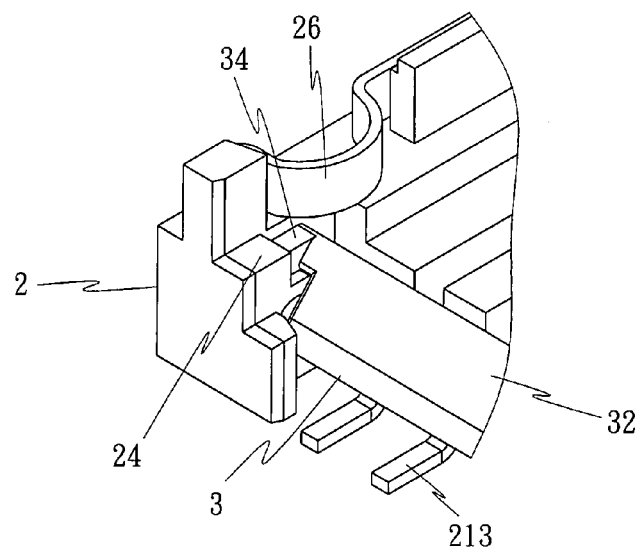
FIG. 7 is an enlarged view of a part of the first embodiment of the present invention, showing the pivot shaft member stopped at the terminal holder block.
Figure 8:
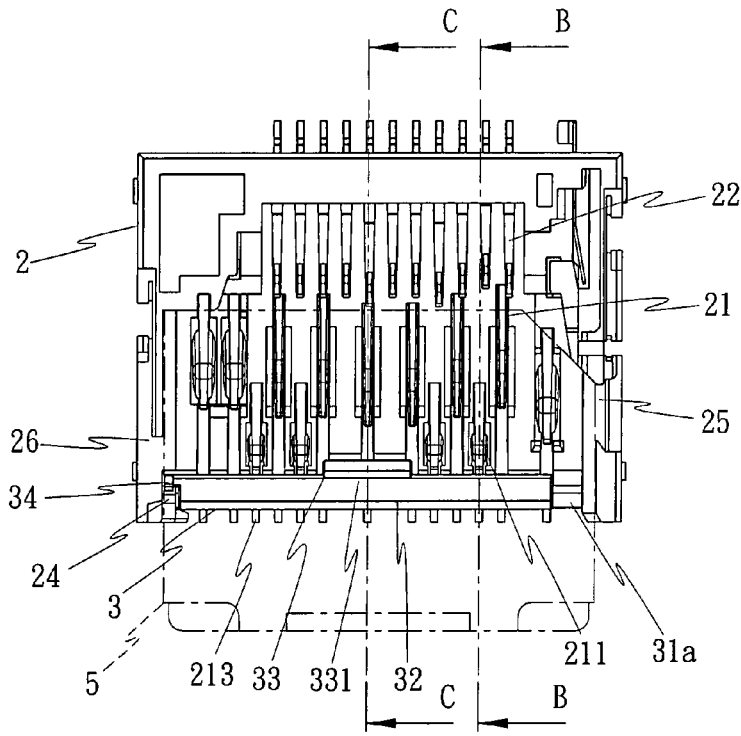
FIG. 8 is similar to FIG. 2 but showing the pivot shaft member rotated.
Figure 9:
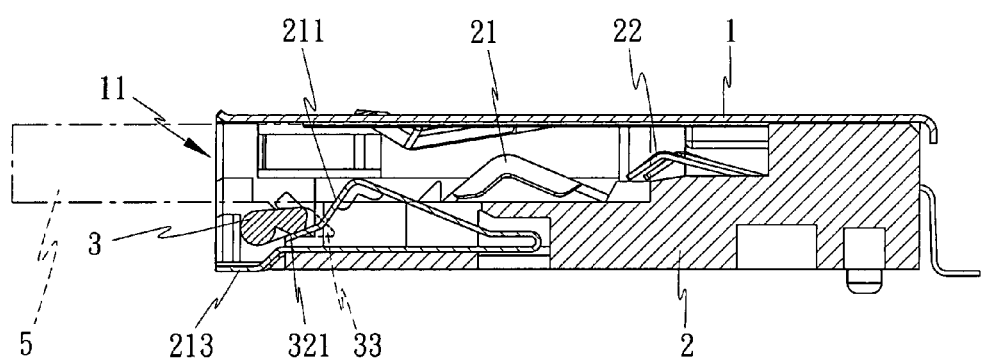
FIG. 9 is a sectional view taken along line B-B of FIG. 8.
Figure 10:
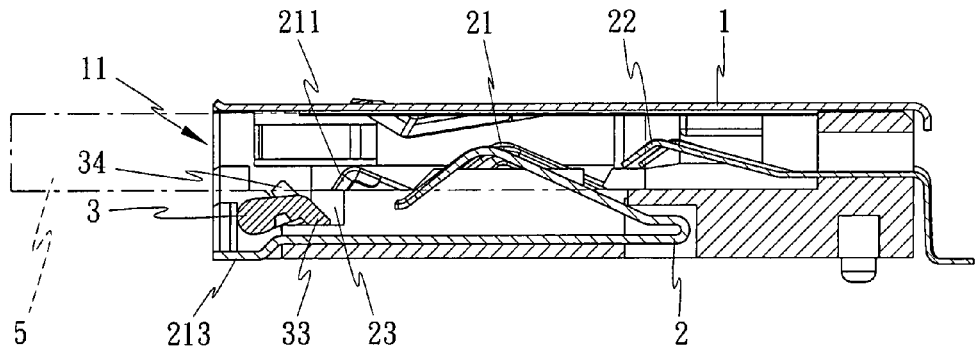
FIG. 10 is a sectional view taken along line C-C of FIG. 8.

The pivot shaft member 3, as shown in FIGS. 1~3, is a long bar having a long pivot pin 31a and a short pivot pin 31b respectively axially extending from the two distal ends. During installation, the long pivot pin 31a is inserted into one pivot hole 111 at one side of the insertion hole 11, and then the short pivot pin 31b is forced into the other pivot hole 111 at the other side of the insertion hole 11. Thus, the pivot shaft member 3 is transversely disposed in the front side of the insertion hole 11, and rotatable relative to the terminal holder block 2. The pivot shaft member 3 has a protruding portion 32 extending along the length, a guide block 33 extending from the protruding portion 32, and a stop block 34 at one end of the protruding portion 32 corresponding to the flange 24 of the terminal holder block 2. The guide block 33 has a substantially horizontally extended guide surface 331. By means of the stop block 34 and the flange 24, the angle of rotation of the pivot shaft member 3 relative to the terminal holder block 2 is limited, so that the protruding portion 32 is constantly kept toward the inside of the insertion hole 11 (see FIG. 2 or FIG. 5).

By means of the arrangement of the pivot shaft member 3 in the front side of the insertion hole 11, the insertion hole 11 is controlled by the pivot shaft member 3 for the insertion of different thickness of memory cards 4 and 5 selectively. Because the guide surface 331 of the pivot shaft member 3 is kept in horizontal or close to horizontal, it guides a thin type memory card (for example, mini SD memory card) 4 into the insertion hole 11 horizontally (see FIGS. 4 and 5) against biasing. When inserting a thick memory card (for example, SD memory card) 5 into the insertion hole 11 (see FIGS. 8~10), the memory card 5 will touch the protruding portion 32 at first, causing rotation of the pivot shaft member 3 through an angle. At this time, the inner part 321 of the protruding portion 32 will force the front row of terminals 211 into the inside of the respective terminal grooves 212 (see FIG. 6), preventing deformation or damage of the terminals 211 due to improper insertion of the memory card into the insertion hole 11.

When ejecting the memory card 5 out of the insertion hole 11 of the memory card connector after a use, the terminals 211 impart a spring force to the pivot shaft member 3, rotating the pivot shaft member 3 in the reversed direction to its former position. Because the invention uses a small number of parts, the memory card connector can easily and quickly be assembled. Further, the simple structural design greatly reduces the cost of the memory card connector.

Further, when the pivot shaft member 3 is rotated by the inserted memory card 5 to force the inner part 321 of the protruding portion 32 against the front row of terminals 211 toward the inside of the respective terminal grooves 212, the recessed receptacle 23 of the terminal holder block 2 provides a space for receiving the guide block 33 of the pivot shaft member 3.

As stated above, the pivot shaft member 3 is pivotally disposed in the front side of the insertion hole 11 to control the gap of the insertion hole 11 for the insertion of a thin type memory card 4 or thick memory card 5. When inserting a thin type memory card 4 into the insertion hole 11, the guide surface 331 of the guide block 33 of the pivot shaft member 3 guides the thin type memory card 4 into the insertion hole 11 in horizontal, prohibiting biasing of the inserted memory card 4. When inserting a thick memory card 5 into the insertion hole 11, the memory card 5 will touch the protruding portion 32 at first, causing rotation of the pivot shaft member 3 through an angle, so that the inner part 321 of the protruding portion 32 will force the front row of terminals 211 into the inside of the respective terminal grooves 212, preventing deformation or damage of the terminals 211 due to improper insertion of the memory card into the insertion hole 11.

Figure 11:
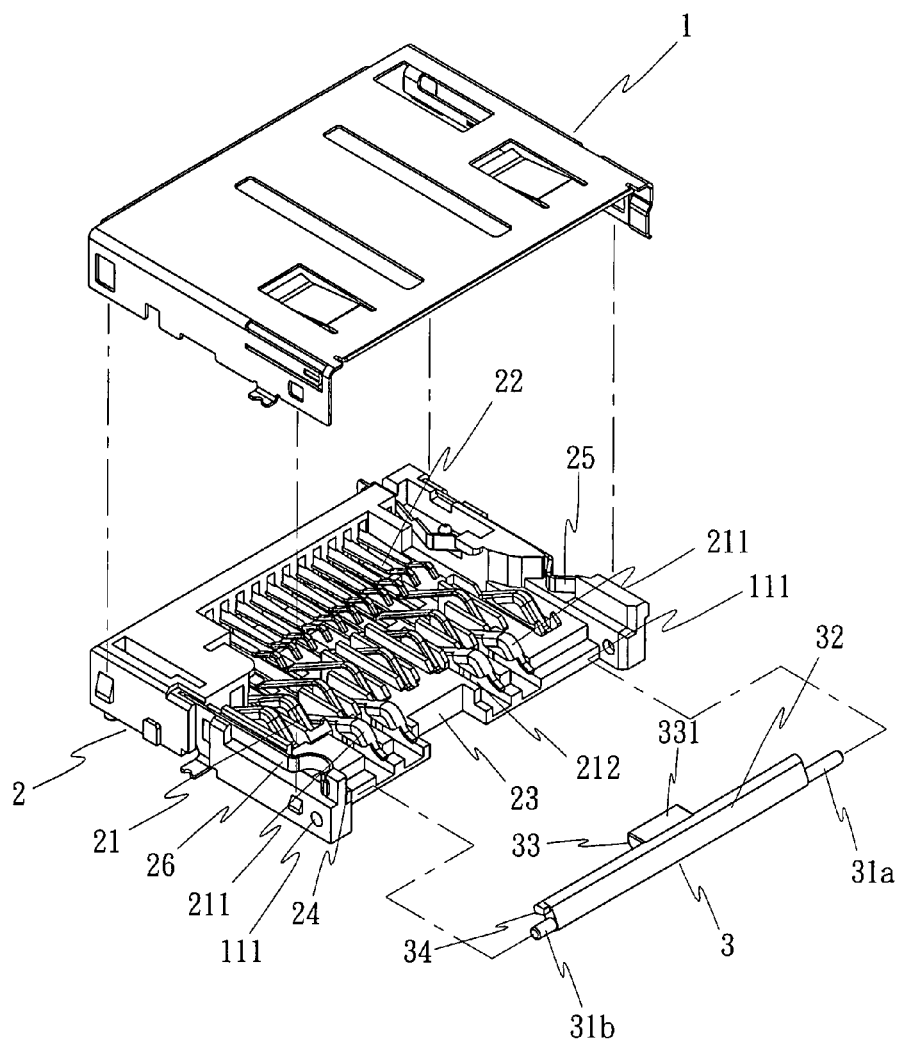
FIG. 11 is an exploded view of a universal memory card connector in accordance with a second embodiment of the present invention.
Figure 12:
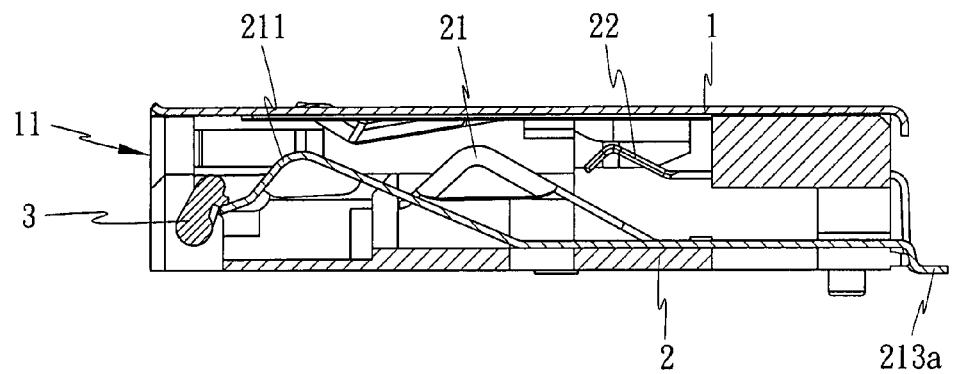
FIG. 12 is a sectional assembly view of the universal memory card connector according to the second embodiment of the present invention.
Figure 13:
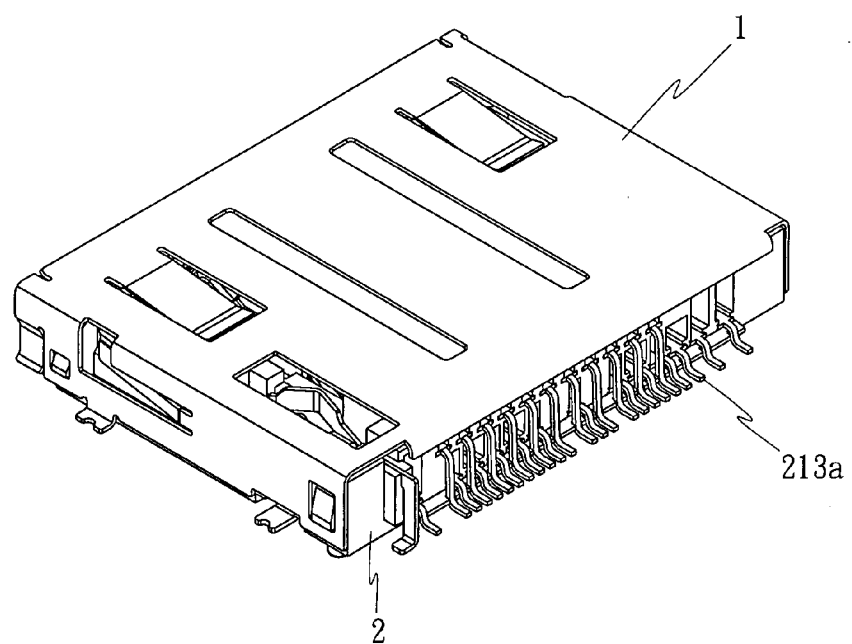
FIG. 13 is an oblique elevation of the universal memory card connector according to the second embodiment of the present invention.

According to the aforesaid first embodiment shown in FIGS. 1~10, the bonding legs 213 of the terminals are disposed at the front side of the terminal holder block 2 (adjacent to the insertion hole 11). FIGS. 11~13 show a memory card connector in accordance with a second embodiment of the present invention. According to this second embodiment, the bonding legs 213a of the terminals are disposed at the rear side of the terminal holder block.

A prototype of memory card connector has been constructed with the features of FIGS. 1~13. The memory card connector functions smoothly to provide all of the features discussed earlier.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. An universal memory card connector comprising an insulative terminal holder block, multiple sets of terminals arranged in rows and mounted in said insulative terminal holder block for contacting one of a set of memory cards, and a top cover covering said insulative terminal holder block and defining with said insulative terminal holder block an insertion hole for inserting one of said memory cards into said insulative terminal holder block to contact one of said multiple sets of terminals, wherein a pivot shaft member positions in an elongated recess portion and is pivotally coupled to said insulative terminal holder block along a front side of said insertion hole and rotatable relative to said insulative terminal holder block to control a gap of said insertion hole for the insertion of a different memory car, said pivot shaft member having at least one protruding portion protruding from a periphery thereof, the protruding portion defining an inner part arranged to engage front ends of a first row of resilient terminals located proximate to the pivot shaft member and the front side of the insertion hole; wherein the front ends extend into the elongated recess portion;

wherein the pivot shaft member is pivotable between an upright position and a direction toward the first row of terminals such that when a memory card is inserted into the connector, the pivot shaft member pivots from the upright position to press the inner part against front ends of the first row terminals, and when the memory card is removed from the connector, the resilient of the first row of the terminals urge the pivot shaft member in the upright position;

wherein said pivot shaft member comprises at least one guide block extended outwardly from the protruding portion and having a guiding surface.

2. The universal memory card connector as claimed in claim 1, wherein said at least one protruding portion is formed integral with the periphery of said pivot shaft member and extending along the length of said pivot shaft member.

3. The universal memory card connector as claimed in claim 1, wherein said insulative terminal holder block comprises two pivot holes aligned at two sides of said insertion hole; said pivot shaft member has a long pivot pin and a short pivot pin respectively axially extending from two opposite ends thereof and respectively pivoted to the pivot holes of said insulative terminal holder block.

4. The universal memory card connector as claimed in claim 1, wherein said guide block has a horizontally extending guide surface.

5. The universal memory card connector as claimed in claim 1, wherein said guide block has a guide surface extending approximately in horizontal.

6. The universal memory card connector as claimed in claim 1, wherein said pivot shaft member comprises a stop block at one end of said at least one protruding portion; said insulative terminal holder lock comprises a flange stopping the stop block of said pivot shaft member.

7. The universal memory card connector as claimed in claim 1, wherein said insulative terminal holder block comprises at least one recessed receptacle for receiving said at least one guide block of said pivot shaft member.

8. The universal memory card connector as claimed in claim 1, wherein the terminals of the first row each have a bonding leg respectively disposed at a front side of said insulative terminal holder block near said insertion hole.

9. The universal memory card connector as claimed in claim 1, wherein said terminals of said multiple sets of terminals each have a bonding leg respectively disposed at a rear side of said insulative terminal holder block remote from said insertion hole.

* * * * *